(12) United States Patent
Kaminski et al.

(10) Patent No.: US 9,300,377 B2
(45) Date of Patent: Mar. 29, 2016

(54) METHOD FOR DOWNLINK COMMUNICATION BY MEANS OF A DOWNLINK SUPERIMPOSED RADIO SIGNAL, A BASE STATION AND A USER TERMINAL THEREFOR

(75) Inventors: Stephen Kaminski, Eislingen (DE); Bozo Cesar, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/514,659

(22) PCT Filed: Nov. 15, 2010

(86) PCT No.: PCT/EP2010/067429
§ 371 (c)(1),
(2), (4) Date: Jun. 8, 2012

(87) PCT Pub. No.: WO2011/069778
PCT Pub. Date: Jun. 16, 2011

(65) Prior Publication Data
US 2012/0236818 A1  Sep. 20, 2012

(30) Foreign Application Priority Data
Dec. 10, 2009  (EP) .................................... 09306206

(51) Int. Cl.
*H04W 72/04* (2009.01)
*H04B 7/04* (2006.01)
*H04B 7/06* (2006.01)

(52) U.S. Cl.
CPC ............ *H04B 7/0452* (2013.01); *H04B 7/0617* (2013.01); *H04B 7/0426* (2013.01)

(58) Field of Classification Search
None
See application file for complete search history.

(56) References Cited

U.S. PATENT DOCUMENTS

| | | | | |
|---|---|---|---|---|
| 2007/0291867 A1* | 12/2007 | Khan et al. | ..................... | 375/267 |
| 2008/0212701 A1* | 9/2008 | Pan et al. | ..................... | 375/260 |
| 2010/0111018 A1* | 5/2010 | Chang, II | ..................... | 370/329 |
| 2010/0220800 A1* | 9/2010 | Erell et al. | ..................... | 375/267 |

(Continued)

FOREIGN PATENT DOCUMENTS

| WO | WO 2007/051111 | 5/2007 |
|---|---|---|
| WO | WO 2008/103313 A2 | 8/2008 |

OTHER PUBLICATIONS

Puttegowda K. et al., "On the Effect of Cancellation Order in Successive Interference Cancellation for CDMA Systems," Vehicular Technology Conference, IEEE, vol. 2, XP010700939, pp. 1035-1039, Oct. 6, 2003.
International Search Report for PCT/EP2010/067429 dated Apr. 11, 2011.
Chinese Office Action dated Apr. 24, 2014.
Japanese Office Action dated Aug. 29, 2013.

(Continued)

*Primary Examiner* — Gregory Sefcheck
*Assistant Examiner* — Jenkey Van
(74) *Attorney, Agent, or Firm* — Fay Sharpe LLP

(57) ABSTRACT

The invention concerns a method for downlink communication between a base station and a user terminal by means of a downlink superimposed radio signal comprising downlink data for the user terminal and for at least one further user terminal that are transmitted using the same radio resources, wherein the downlink data for the user terminal are transmitted with lower power than the downlink data for the at least one further user terminal, and control information is sent in downlink from the base station to the user terminal that enables the user terminal to decode the downlink data for the at least one further user terminal, a base station, a user terminal and a communication network therefor.

9 Claims, 6 Drawing Sheets

(56) References Cited

U.S. PATENT DOCUMENTS

| | | | |
|---|---|---|---|
| 2010/0254268 A1* | 10/2010 | Kim et al. | 370/241 |
| 2011/0293028 A1* | 12/2011 | Panicker et al. | 375/260 |
| 2012/0039180 A1* | 2/2012 | Kim et al. | 370/241 |
| 2012/0201162 A1* | 8/2012 | Kim et al. | 370/252 |

OTHER PUBLICATIONS

Chen, Yejian, "An Adaptive Multiuser MIMO Receive Algorithm with Radial Space-Division Multiple Access in OFDM System", Vehicular Technology Conference (VTC 2010-Spring), 2010, IEEE $71^{st}$, May 16, 2010.

\* cited by examiner

| AL | |
|---|---|
| 00 | aggregation level ≤ 2, legacy DCI follows |
| 01 | aggregation level ≤ 2, RDMA DCI follows |
| 10 | aggregation level ≥ 4, RDMA DCI follows |
| 11 | aggregation level ≥ 4, legacy DCI follows |
Fig. 7
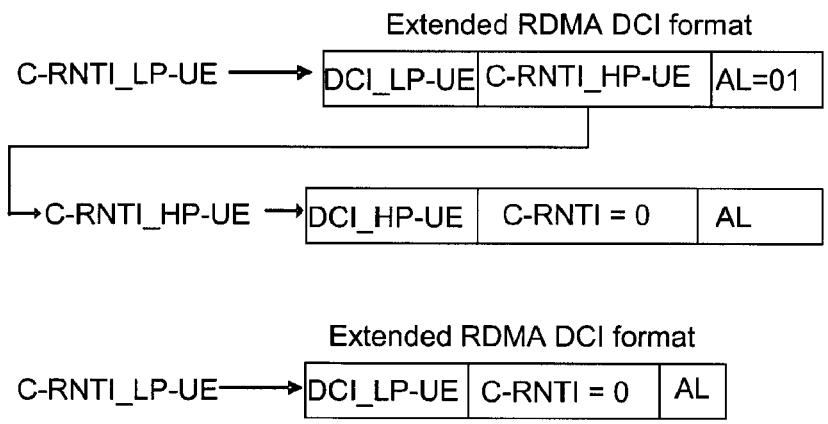
Fig. 8
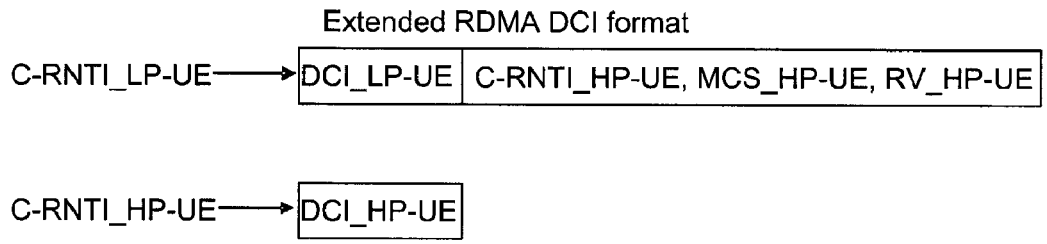
Fig. 9

METHOD FOR DOWNLINK COMMUNICATION BY MEANS OF A DOWNLINK SUPERIMPOSED RADIO SIGNAL, A BASE STATION AND A USER TERMINAL THEREFOR

FIELD OF THE INVENTION

The invention relates to a method for downlink communication between a base station and a user terminal by means of a downlink superimposed radio signal comprising downlink data for the user terminal and for at least one further user terminal that are transmitted using the same radio resources, and a base station and a user terminal adapted to perform said method.

BACKGROUND

Besides having significantly enhanced throughput, fourth generation (4G) cellular wireless access systems are expected to be cost efficient and to provide sufficient performance even at the cell edge. Using the so-called radial space-division multiple access (RDMA), the system's spectral efficiency can be significantly improved, and fairness among users without increasing the number of antennas and without requiring fast backbone communication and synchronization between base stations can be provided. The basic idea is to increase the capacity of the multi-user channel under fairness constraints by exploiting not only the angular dimension of space, as in space-division multiple access (SDMA), but also the radial dimension by using simultaneous transmission of multiple signals over the same radio resource and joint detection in the receiver. Significant throughput gains are achieved with low complexity methods requiring only long term channel statistics and no instantaneous channel state information at the transmitter. These throughput gains can be achieved without requiring more advanced analogue hardware or increasing bandwidth or transmit power.

SUMMARY

To increase the spectrum efficiency, in radial space-division multiple access (RDMA), more than one user terminal participate in the scheduling on the same resource, as e.g. on the same frequency, at the same time, as e.g. in the same subframe. As an example, two radio signals with different power levels, a low-power data stream and a high-power data stream, are superimposed and transmitted in the same frame resource, i.e. in the same burst. For the RDMA scheme in downlink, the low-power data stream usually is transmitted to the user terminal which is closer to the base station due to the lower path loss, and the high-power data stream usually is transmitted to the user terminal which is farther from the base station due to the higher path loss.

To decode its own point to point data stream located in the burst, a user terminal gets all the required information, as e.g. location of the burst, modulation and coding scheme and redundancy version, in a downlink grant description, which is individual for each user terminal.

The main problem of the method for downlink communication by means of a downlink superimposed radio signal according to the prior art is, that the low-power user terminal, i.e. the user terminal which is closer to the base station, can not decode its low-power data stream, as the high-power data stream is superimposed on its low-power data stream using the same resource.

The object of the invention is thus to enable a user terminal to decode its own data stream in case that another data stream of another user terminal is superimposed using the same resource, so that a method for downlink communication by means of a downlink superimposed radio signal can be performed.

This object is achieved by a method for downlink communication between a base station and a user terminal by means of a downlink superimposed radio signal comprising downlink data for the user terminal and for at least one further user terminal that are transmitted using the same radio resources, wherein the downlink data for the user terminal are transmitted with lower power than the downlink data for the at least one further user terminal, control information is sent in downlink from the base station to the user terminal that enables the user terminal to decode the downlink data for the at least one further user terminal, the user terminal successively reduces the superimposed radio signal by decoding the downlink data for the at least one further user terminal in the order of the downlink transmission power starting with the highest one, reconstructing the radio signal of the downlink data for the at least one further user terminal, and subtracting the radio signal of the downlink data for the at least one further user terminal from the superimposed radio signal, and the user terminal decodes its own downlink data using the superimposed radio signal that has been reduced by the radio signal for the at least one further user terminal.

The object is furthermore achieved by a base station for downlink communication with a user terminal by means of a downlink superimposed radio signal comprising downlink data for the user terminal and for at least one further user terminal that are transmitted using the same radio resources, said base station comprising at least one processing means adapted to transmit the downlink data for the user terminal with lower power than the downlink data for the at least one further user terminal, and adapted to send control information in downlink to the user terminal that enables the user terminal to decode the downlink data for the at least one further user terminal.

The object is furthermore achieved by a user terminal for downlink communication with a base station by means of a downlink superimposed radio signal comprising downlink data for the user terminal and for at least one further user terminal that are transmitted using the same radio resources, said user terminal comprising at least one processing means adapted to successively reduce the superimposed radio signal by decoding the downlink data for the at least one further user terminal in the order of the downlink transmission power starting with the highest one, reconstructing the radio signal of the downlink data for the at least one further user terminal, and subtracting the radio signal of the downlink data for the at least one further user terminal from the superimposed radio signal, and adapted to decode its own downlink data using the superimposed radio signal that has been reduced by the radio signal for the at least one further user terminal.

In order to decode its low-power data stream, a low-power user terminal, i.e. the user terminal which is closer to the base station, has to receive and decode the high-power data stream of the user terminal which is farther from the base station too.

To be able to decode the superimposed high-power data stream of the high-power user terminal, i.e. of the user terminal which is farther from the base station, the low-power user terminal needs additional information, as e.g. the modulation and coding scheme and the redundancy version of the superimposed high-power data stream. In methods according to the prior art, no means are foreseen to provide said information of a foreign burst, i.e. of the high-power data stream, to the low-power user terminal.

One possibility for a base station to announce superimposed data transmission is to generate grants in such a way, that each grant for the low-power data stream is extended and comprises at least a pointer, as e.g. a respective cell-specific radio network temporary identifier (C-RNTI), to the high-power data stream. Additionally, an aggregation level range may be signaled for the search of the next downlink control information (DCI) related to the high-power data stream, i.e. the aggregation level range indicates, in which range the low-power user terminal shall search for the corresponding high-power grant.

The low-power user terminal always first searches for grants dedicated to its own cell-specific radio network temporary identifier (C-RNTI). If this grant is extended, i.e. it contains a pointer related to the high-power user terminal, the low-power user terminal searches for the corresponding grants of the high-power user terminal and decodes them too. If an aggregation level range is included in the grant, the low-power user terminal searches for the next grant indicated by the pointer related to the high-power user terminal only in the specified aggregation level range. If the next grant is again an extended grant, the low-power user terminal will repeat the search for grants related to the additional pointer found in the extended grant, until the last grant is found, that does not contain any extended RDMA-related information anymore.

Besides the general ability to participate in the RDMA transmission scheme, the change of the behavior of an RDMA capable user terminal compared to the behavior of a legacy user terminal for LTE release 8 is that the RDMA capable user terminal has to listen to more than one downlink grant starting with grants related to its own cell-specific radio network temporary identifier (C-RNTI) and successively searching for additional grants of higher-power user terminals. Then, the RDMA capable user terminal subtracts each of the radio signals of the additional data streams from the overall received radio signal. The data stream which is related to the cell-specific radio network temporary identifier (C-RNTI) of the RDMA capable user terminal is considered to be the own data stream of the RDMA capable user terminal. The data stream of the RDMA capable user terminal is obtained out of the remaining radio signal and is then transferred to the higher layers in the last step. In contrast, the higher-power data streams are not transferred to the higher layers.

A mixed operation of legacy user terminals and RDMA capable user terminals is possible. A legacy user terminal can only be operated without RDMA or as the high-power user terminal as described above in an embodiment with a high-power data stream and a low-power data stream which are superimposed. In embodiments with more than two superimposed data streams, a legacy user terminal can be related to the last DCI in a chain of linked DCIs, i.e. it can be the highest-power user terminal.

Another possibility for a base station to announce superimposed data transmission is to generate grants in such a way, that each grant for a low-power data stream is extended by all information required to decode the high-power data stream too.

According to an embodiment of the invention, once the low-power user terminal has the information to decode the low-power data stream and the high-power data stream, the low-power user terminal first decodes the high-power data stream, and then reconstructs and subtracts the radio signal of the high-power data stream from the superimposed radio signal. Afterwards, the low-power data stream is extracted from the resulting radio signal, which does not contain the high-power data stream anymore.

In the current Third Generation Partnership Project Long Term Evolution (3GPP LTE) release 8 system, no means are foreseen to transmit the grant description of a point to point data stream for a first user terminal to a second user terminal. Thus, according to the embodiment of the invention, a solution to simultaneously and highly efficient transmit grant descriptions of superimposed point to point data streams to all user terminals involved in the RDMA transmission is provided.

The number of user terminals participating in an RDMA transmission on the same resources shall not be limited to two user terminals. Thus, according to an embodiment of the invention, the signaling is capable to address two or more user terminals simultaneously.

The invention is described in the following within the framework of 3GPP LTE. However, as the invention is not restricted to 3GPP LTE, but can in principle be applied in other networks that can exploit the radial dimension by using simultaneous transmission of multiple signals over the same radio resource and joint detection in the receiver, like e.g. in WiMAX networks (WiMAX=Worldwide Interoperability for Microwave Access), in the following, instead of the term eNodeB, the more general term base station is used.

Further developments of the invention can be gathered from the dependent claims and the following description.

BRIEF DESCRIPTION OF THE FIGURES

In the following the invention will be explained further making reference to the attached drawings.

FIG. 7 schematically shows an example of a coding format of aggregation level ranges and downlink control information according to an embodiment of the invention.

FIG. 8 schematically shows an example of an extended format of chain-like linked downlink control information comprising aggregation levels and an indication of the end of the chain according to an embodiment of the invention.

FIG. 9 schematically shows an example of an extended format of downlink control information comprising information needed to decode a data stream of another user terminal according to an embodiment of the invention.

DESCRIPTION OF THE EMBODIMENTS

Figure 1:
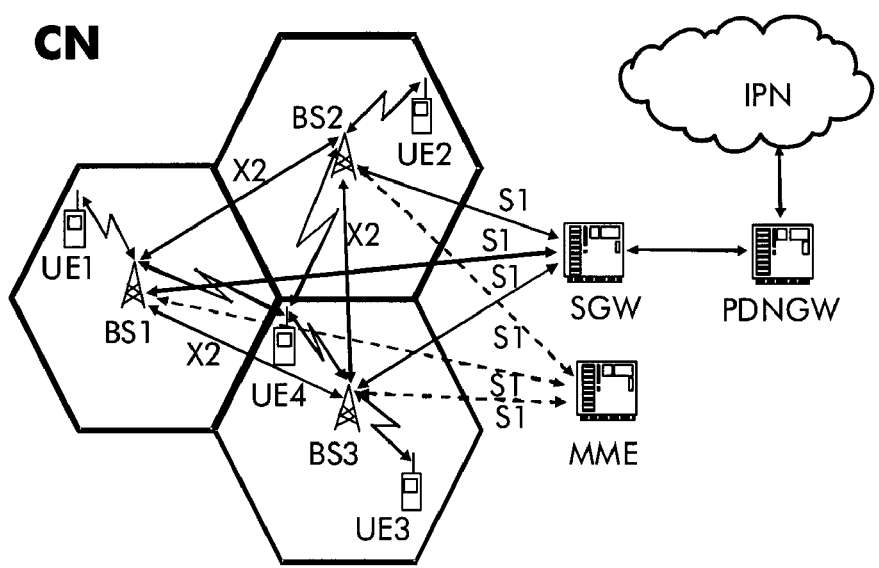
FIG. 1 schematically shows a communication network in which the invention can be implemented.

FIG. 1 shows as an example of a communication network in which the invention can be implemented a communication network CN according to the standard 3GPP LTE.

Said communication network CN comprises base stations BS1-BS3, user terminals UE1-UE4, a serving gateway SGW, a packet data network gateway PDNGW, and a mobility management entity MME.

Each of said user terminals UE1-UE4 is connected via radio connections to one or multiple of said base stations BS1-BS3, which is symbolized by flashes in FIG. 1. The base stations BS1-BS3 are in turn connected to the serving gateway SGW and to the mobility management entity MME, i.e. to the evolved packet core (EPC), via the so-called S1 interface.

The base stations BS1-BS3 are connected among each other via the so-called X2 interface.

The serving gateway SGW is connected to the packet data network gateway PDNGW, which is in turn connected to an external IP network IPN.

The S1 interface is a standardized interface between a base station BS1-BS3, i.e. a eNodeB in this example, and the Evolved Packet Core (EPC). The S1 interface has two flavours, S1-MME for exchange of signalling messages between the base station BS1-BS3 and the mobility management entity MME and S1-U for the transport of user datagrams between the base station BS1-BS3 and the serving gateway SGW.

The X2 interface is added in 3GPP LTE standard in order to transfer the user plane signal and the control plane signal during handover, and in order to perform coordinated multipoint reception or transmission. For coordinated multipoint reception in uplink, base stations BS1-BS3 in the coordination area or group transfer the data which they received at their respective air interface to a coordinating device, e.g. to a master base station BS3 or to an external coordinated multipoint coordinating device which is not shown in FIG. 1, preferably via the so-called X2 interface, i.e. via the backhaul, for evaluation of the data from the different base stations BS1-BS3.

The serving gateway SGW performs routing of the IP user data between the base station BS1-BS3 and the packet data network gateway PDNGW. Furthermore, the serving gateway SGW serves as a mobile anchor point during handover either between different base stations, or between different 3GPP access networks.

The packet data network gateway PDNGW represents the interface to the external IP network IPN and terminates the so-called EPS bearer (EPS=Evolved Packet System) which is established between a user terminal (UE1-UE4) and the respective serving base station (BS1-BS3).

The mobility management entity MME performs tasks of the subscriber management and the session management, and also performs the mobility management during handover between different access networks.

Figure 2:
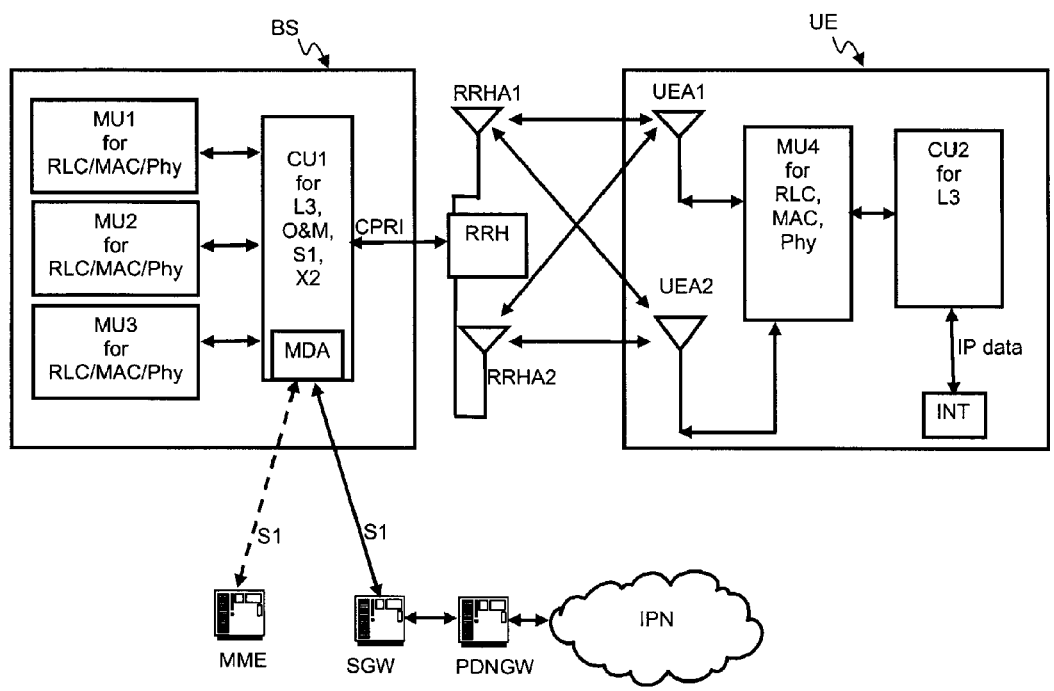
FIG. 2 schematically shows the structure of a user terminal and a base station in which the invention can be implemented.

FIG. 2 schematically shows the structure of a user terminal and a base station BS in which the invention can be implemented.

The base station BS comprises by way of example three modem unit boards MU1-MU3 and a control unit board CU1, which in turn comprises a media dependent adapter MDA.

The three modem unit boards MU1-MU3 are connected to the control unit board CU1, and the control unit board CU1 is in turn connected to a remote radio head RRH via a so-called Common Public Radio Interface (CPRI).

The remote radio head RRH is connected by way of example to two remote radio head antennas RRHA1 and RRHA2 for transmission and reception of data via a radio interface.

The media dependent adapter MDA is connected to the mobility management entity MME and to the serving gateway SGW and thus to the packet data network gateway PDNGW, which is in turn connected to the external IP network IPN.

The user terminal UE comprises by way of example two user terminal antennas UEA1 and UEA2, a modem unit board MU4, a control unit board CU2, and interfaces INT.

The two user terminal antennas UEA1 and UEA2 are connected to the modem unit board MU4. The modem unit board MU4 is connected to the control unit board CU2, which is in turn connected to interfaces INT.

The modem unit boards MU1-MU4 and the control unit boards CU1, CU2 may comprise by way of example Field Programmable Gate Arrays (FPGA), Digital Signal Processors (DSP), switches and memories, like e.g. Double Data Rate Synchronous Dynamic Random Access Memories (DDR-SDRAM) in order to be enabled to perform the tasks described above.

The remote radio head RRH comprises the so-called radio equipment, e.g. modulators and amplifiers, like delta-sigma modulators (DSM) and switch mode amplifiers.

In downlink, IP data received from the external IP network IPN are transmitted from the packet data network gateway PDNGW via the serving gateway SGW to the media dependent adapter MDA of the base station BS on an EPS bearer. The media dependent adapter MDA allows for a connectivity of different media like e.g. video streaming or web browsing.

The control unit board CU1 performs tasks on layer 3, i.e. on the radio resource control (RRC) layer, such as measurements and cell reselection, handover and RRC security and integrity.

Furthermore, the control unit board CU1 performs tasks for Operation and Maintenance, and controls the S1 interfaces, the X2 interfaces, and the Common Public Radio Interface.

The control unit board CU1 sends the IP data received from the serving gateway SGW to a modem unit board MU1-MU3 for further processing.

The three modem unit boards MU1-MU3 perform data processing on layer 2, i.e. on the PDCP layer (PDCP=Packet Data Convergence Protocol) which is e.g. responsible for header compression and ciphering, on the RLC layer (RLC=Radio Link Control) which is e.g. responsible for segmentation and Automatic Repeat Request (ARQ), and on the MAC layer (MAC=Media Access Control) which is responsible for MAC multiplexing and Hybrid Repeat Request (HARQ).

Furthermore, the three modem unit boards MU1-MU3 perform data processing on the physical layer, i.e. coding, modulation, and antenna and resource-block mapping.

The coded and modulated data are mapped to antennas and resource blocks and are sent as transmission symbols from the modem unit board MU1-MU3 via the control unit board CU over the Common Public Radio Interface to the remote radio head and the respective remote radio head antenna RRHA1, RRHA2 for transmission over an air interface.

The Common Public Radio Interface (CPRI) allows the use of a distributed architecture where base stations BS, containing the so-called radio equipment control, are connected to remote radio heads RRH preferably via lossless fibre links that carry the CPRI data. This architecture reduces costs for service providers because only the remote radio heads RRH containing the so-called radio equipment, like e.g. amplifiers, need to be situated in environmentally challenging locations. The base stations BS can be centrally located in less challenging locations where footprint, climate, and availability of power are more easily managed.

The user terminal antennas UE1, UE2 receive the transmission symbols, and provide the received data to the modem unit board MU4.

The modem unit board MU4 performs data processing on the physical layer, i.e. antenna and resource-block demapping, de-modulation and decoding.

Furthermore, the modem unit board MU4 performs data processing on layer 2, i.e. on the on the MAC layer (MAC=Media Access Control) which is responsible and Hybrid Repeat Request (HARQ) and for MAC demultiplexing, on the RLC layer (RLC=Radio Link Control) which is e.g. responsible for reassembly and Automatic Repeat Request (ARQ), and on the PDCP layer (PDCP=Packet Data Convergence Protocol) which is e.g. responsible for deciphering and header compression.

The processing on the modem unit board MU4 results in IP data which are sent to the control unit board CU2, which performs tasks on layer 3, i.e. on the radio resource control (RRC) layer, such as measurements and cell reselection, handover and RRC security and integrity.

The IP data are transmitted from the control unit board CU2 to respective interfaces INT for output and interaction with a user.

In the uplink, data transmission is performed in an analogue way in the reverse direction from the user terminal UE to the external IP network IPN.

Figure 3:
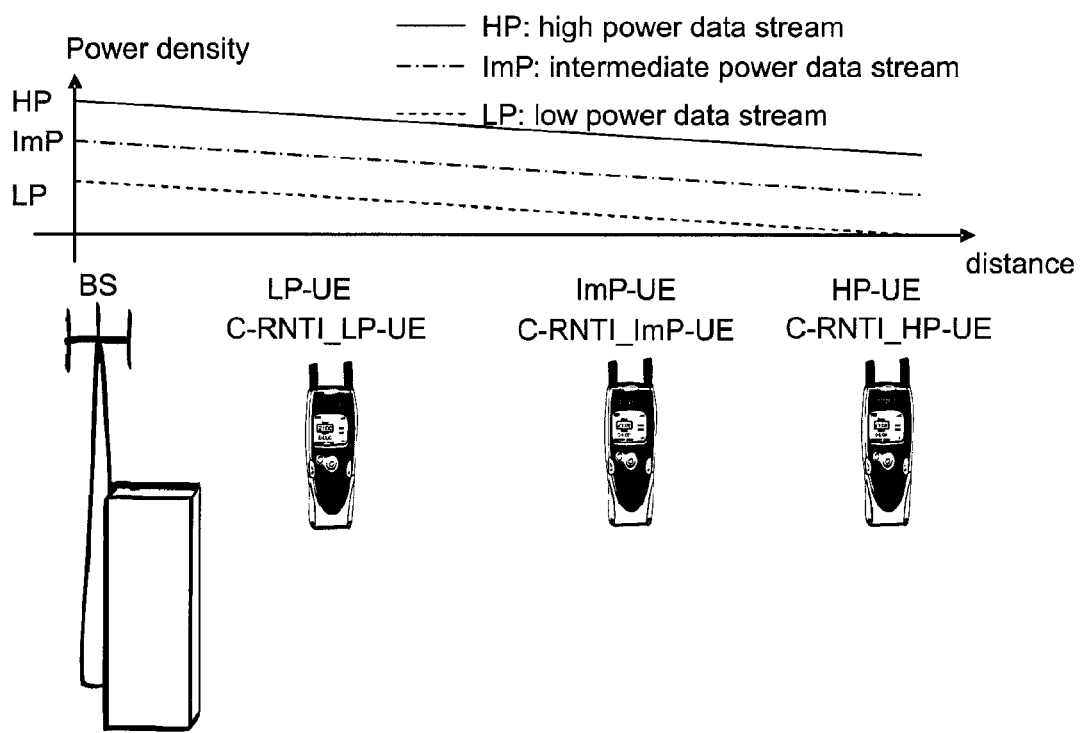
FIG. 3 schematically shows exemplarily the power density of three superimposed data streams.

FIG. 3 schematically shows exemplarily the power density of three superimposed downlink data streams HP, ImP, LP dependent on the distance from the base station BS. The power density of the downlink data streams HP, ImP, LP decreases with increasing distance from the base station.

The downlink data stream LP with the lowest power density belongs to the user terminal LP-UE which has the smallest distance to the base station BS.

The downlink data stream ImP with the intermediate power density belongs to the user terminal ImP-UE which has the intermediate distance to the base station BS.

The downlink data stream HP with the highest power density belongs to the user terminal HP-UE which has the largest distance to the base station BS.

In order to decode its low-power data stream LP, the user terminal LP-UE also has to decode the high-power data stream HP of the user terminal HP-UE, and the intermediate-power data stream ImP of the user terminal ImP-UE, as the three data streams HP, ImP, LP are transmitted using the same resource blocks. Thus, the user terminal LP-UE needs additional information to be enabled to decode the data streams HP and ImP which it gets according to an embodiment of the invention as described in the following.

Figure 4:
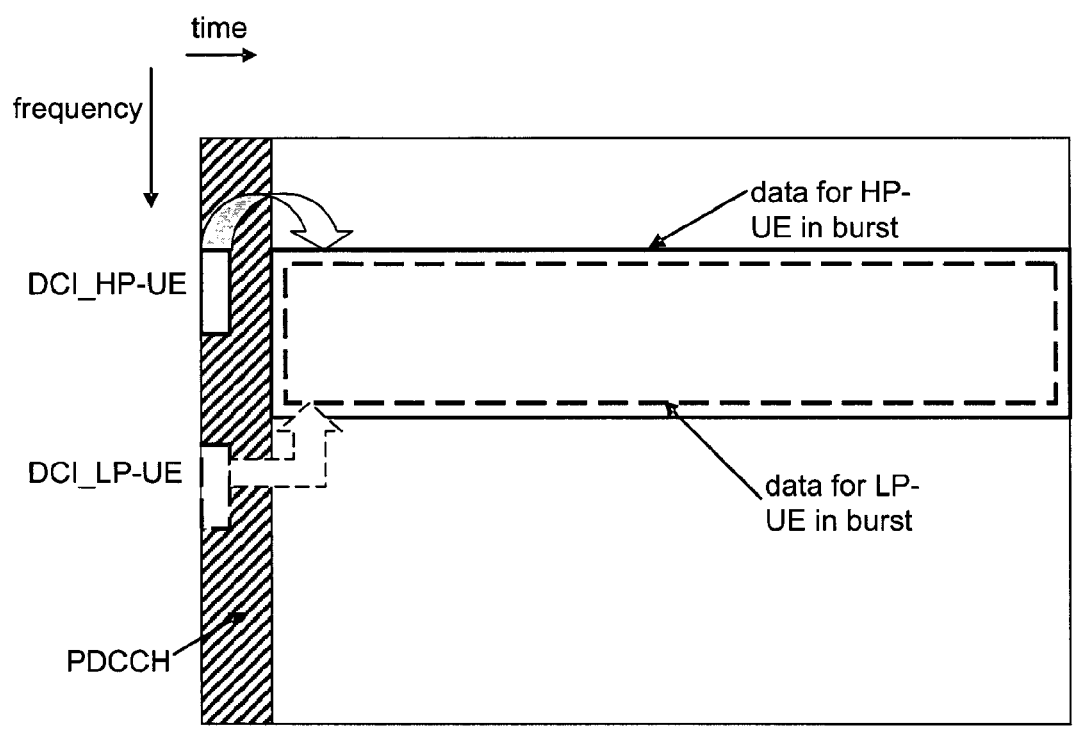
FIG. 4 schematically shows exemplarily the signalling of two data streams using the same frequency resource.

In FIG. 4, the time-frequency resources used for downlink transmission are depicted. FIG. 4 schematically shows exemplarily the signalling of two data streams, a high-power data stream of a high-power user terminal HP-UE and a low-power data stream of a low-power user terminal LP-UE using the same frequency resources, i.e. the same resource blocks in the same burst.

The time-frequency resources of the so-called control region, which is indicated by a striped area in the time-frequency grid, are used to build so-called physical downlink control channels (PDCCH). So-called resource elements within the control region are used as so-called control channel elements to build the physical downlink control channels (PDCCH).

A physical downlink control channel carries downlink control information (DCI), which includes downlink grants, i.e. downlink scheduling assignments comprising resource indications of the physical downlink shared channel (PDSCH), indications of the used transport formats and information about the used hybrid automatic repeat request (HARQ).

In FIG. 4, the downlink control information DCI_HP-UE for the high-power user terminal HP-UE, and the downlink control information DCI_LP-UE for the low-power user terminal LP-UE indicate that the same time-frequency resources are used in a subframe, i.e. in a burst, for data transmission.

To be able to decode the high-power data stream, the low-power user terminal LP-UE needs information about the high-power data stream, as e.g. the related cell-specific radio network temporary identifier (C-RNTI), the used modulation and coding scheme (MCS), and the used redundancy version (RV) in addition to the announcement of information required for decoding of its own low-power data stream. The cell-specific radio network temporary identifier (C-RNTI) is an identity used for signaling purposes between the user terminal and the network. The modulation and coding scheme (MCS) indicates which modulation scheme, as e.g. QAM (QAM=quadrature amplitude modulation) or QPSK (QPSK=quadrature phase shift keying), in combination with which coding rate is used. As not all the bits that are generated by the coding scheme must be sent, the redundancy version indicates, which of the coded bits are really sent.

According to an embodiment of the invention, information about the high-power data stream are provided to the low-power user terminal LP-UE by means of extending the LTE release 8 DCI formats. Such extended DCI formats are generated by extending the LTE release 8 DCI formats by the cell-specific radio network temporary identifier C-RNTI of the high-power user terminal HP-UE.

Figure 5:
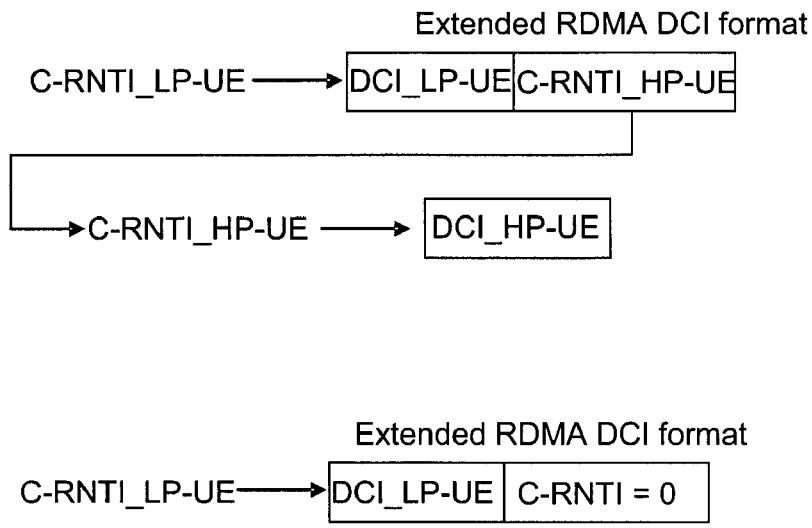
FIG. 5 schematically shows an example of an extended format of chain-like linked downlink control information according to an embodiment of the invention.

FIG. 5 schematically shows an example of an extended format of chain-like linked downlink control information according to an embodiment of the invention.

In order to be able to decode the high-power data stream of the high-power user terminal HP-UE, the low-power user terminal LP-UE is configured, e.g. by a serving base station, to search in the received downlink data for extended DCI formats related to its cell-specific radio network temporary identifier C_RNTI_LP-UE. Once the low-power user terminal LP-UE has found an extended DCI format related to its cell-specific radio network temporary identifier C_RNTI_LP-UE, the low-power user terminal LP-UE decodes the extended DCI.

In the decoded extended DCI, as shown in the upper part of FIG. 5, there is both a DCI of the low-power user terminal DCI_LP-UE, and, according to an embodiment of the invention, a cell-specific radio network temporary identifier for the high-power user terminal C-RNTI_HP-UE.

The low-power user terminal LP-UE searches in the received downlink data for a legacy DCI of the high-power user terminal DCI_HP-UE related to the cell-specific radio network temporary identifier C-RNTI_HP-UE.

The low-power user terminal LP-UE decodes the legacy DCI of the high-power user terminal HP-UE. In said legacy DCI of the high-power user terminal DCI_HP-UE, the low-power user terminal LP-UE finds all the information needed to decode the high-power data stream.

Then, the low-power user terminal LP-UE is able to first decode the high-power data stream, reconstruct the radio signal of the high-power data stream, subtract the radio signal of the high-power data stream from the superimposed radio signal comprising the radio signal of the high-power data stream and the radio signal of the low-power data stream, and then decode the low-power data stream using the superimposed radio signal that has been reduced by the radio signal of the high-power data stream.

The high-power user terminal HP-UE on the contrary only searches in the received downlink data for the legacy DCI of the high-power user terminal DCI_HP-UE related to its cell-specific radio network temporary identifier C_RNTI_HP-UE, in which the high-power user terminal HP-UE finds all the information needed to decode the high-power data stream.

According to an embodiment of the invention, if the low-power user terminal LP-UE is configured to search in the received downlink data for an extended DCI format, but in a subframe no high-power data stream can be found which can be superimposed on the same resources with a low-power data stream transmitted to the low-power user terminal LP-UE, then this is indicated by setting the cell-specific radio network temporary identifier C_RNTI to 0 as shown in the lower part of FIG. 5.

In the embodiments described in FIGS. 4 and 5, two radio signals related to two user terminals LP-UE and HP-UE are superimposed, but in principle n radio signals can be superimposed when the cell-specific radio network temporary identifier C_RNTI_HP-UE in the extended DCI format points to another extended DCI format of another user terminal. Thus a chain of extended DCI formats can be generated related to bursts which all are superimposed.

Figure 6:
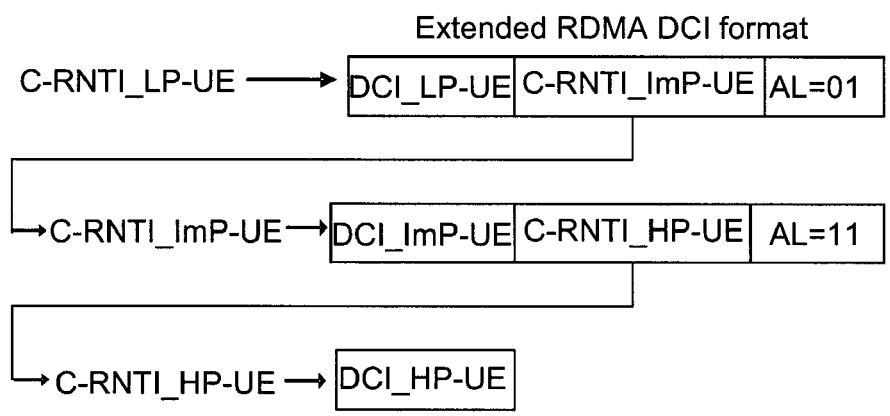
FIG. 6 schematically shows an example of an extended format of chain-like linked downlink control information comprising aggregation levels according to an embodiment of the invention.

FIG. 6 schematically shows an example of an extended format of chain-like linked downlink control information comprising aggregation levels according to an embodiment of the invention. Three data streams to a low-power user terminal LP-UE, an intermediate-power user terminal ImP-UE, and a high-power user terminal HP-UE are superimposed. However, in general n data streams can be superimposed.

In order to be able to decode its data stream, the low-power user terminal LP-UE also has to decode the intermediate-power data stream and the high-power data stream and therefore needs additional information which it gets by the procedure described in the following.

In order to be able to decode the intermediate-power data stream of the intermediate-power user terminal ImP-UE, and the high-power data stream of the high-power user terminal HP-UE, the low-power user terminal LP-UE is configured, e.g. by a serving base station, to search in the received downlink data for extended DCI formats related to its cell-specific radio network temporary identifier C_RNTI_LP-UE on all aggregation levels. Once the low-power user terminal LP-UE has found an extended DCI format related to its cell-specific radio network temporary identifier C_RNTI_LP-UE, the low-power user terminal LP-UE decodes the extended DCI.

In the decoded extended DCI, as shown in FIG. 6, there is both a DCI of the low-power user terminal DCI_LP-UE, and, according to the embodiment of the invention, a cell-specific radio network temporary identifier for the intermediate-power user terminal C-RNTI_ImP-UE. Furthermore, the extended DCI format also comprises a value AL indicating an aggregation level of the DCI of the intermediate-power user terminal ImP-UE which reduces the processing effort for the low-power user terminal LP-UE when searching the DCI for the intermediate-power user terminal ImP-UE.

An example of a possible coding of the aggregation level is depicted in FIG. 7 and will be described below. In the example depicted in FIG. 6, the aggregation level of the DCI of the intermediate-power user terminal ImP-UE has been coded as AL=01, which means that the DCI of the intermediate-power user terminal ImP-UE has to be searched on an aggregation level ≤2 only. In addition the value AL=01 also indicates the DCI format of the intermediate-power user terminal ImP-UE, which in the example also is an extended DCI format.

The low-power user terminal LP-UE therefore searches in the received downlink data for an extended DCI format of the intermediate-power user terminal related to the cell-specific radio network temporary identifier C_RNTI_ImP-UE. Once the low-power user terminal LP-UE has found an extended DCI format related to the cell-specific radio network temporary identifier C_RNTI_ImP-UE, the low-power user terminal LP-UE decodes the extended DCI.

In the decoded extended DCI, as shown in FIG. 6, there is both a DCI of the intermediate-power user terminal DCI_ImP-UE, in which the low-power user terminal LP-UE finds all the information needed to decode the intermediate-power data stream, and, according to an embodiment of the invention, a cell-specific radio network temporary identifier for the high-power user terminal C-RNTI_HP-UE. Furthermore, the extended DCI format also comprises a value AL indicating an aggregation level of the DCI of the high-power user terminal HP-UE which reduces the processing effort for the low-power user terminal LP-UE when searching the DCI for the high-power user terminal HP-UE.

In the example depicted in FIG. 6, the aggregation level of the DCI of the high-power user terminal HP-UE has been coded as AL=11, which means that the DCI of the high-power user terminal HP-UE has to be searched on an aggregation level ≥4 only. In addition the value AL=11 also indicates the DCI format of the high-power user terminal HP-UE, which in the example is a legacy DCI format.

The low-power user terminal LP-UE searches in the received downlink data for a legacy DCI of the high-power user terminal DCI_HP-UE related to the cell-specific radio network temporary identifier C-RNTI_HP-UE.

The low-power user terminal LP-UE decodes the legacy DCI of the high-power user terminal HP-UE. In said legacy DCI of the high-power user terminal DCI_HP-UE, the low-power user terminal LP-UE finds all the information needed to decode the high-power data stream.

Then, the low-power user terminal LP-UE decodes in a first step the high-power data stream, reconstructs the radio signal of the high-power data stream and subtracts the radio signal of the high-power data stream from the superimposed radio signal comprising the radio signal of the high-power data stream, the radio signal of the intermediate-power data stream, and the radio signal of the low-power data stream.

In a second step, the low-power user terminal LP-UE decodes the intermediate-power data stream using the superimposed radio signal that has been reduced by the radio signal of the high-power data stream, reconstructs the radio signal of the intermediate-power data stream and subtracts the radio signal of the intermediate-power data stream from the superimposed radio signal comprising the radio signal of the intermediate-power data stream and the radio signal of the low-power data stream.

In a third step, the low-power user terminal LP-UE decodes the low-power data stream using the superimposed radio signal that has been reduced by the radio signal of the high-power data stream and the radio signal of the intermediate-power data stream.

In this embodiment, in order to be able to decode the high-power data stream of the high-power user terminal HP-UE, the intermediate-power user terminal ImP-UE is configured, e.g. by a serving base station, to search in the received downlink data for extended DCI formats related to its cell-specific radio network temporary identifier C_RNTI_ImP-UE.

The intermediate-power user terminal ImP-UE has to search the extended DCI format related to its cell-specific radio network temporary identifier C_RNTI_ImP-UE on all aggregation levels to be able to decode its intermediate-power data stream, and has to search the legacy DCI format for the cell-specific radio network temporary identifier C_RNTI_HP-UE on aggregation level ≥4 only to be able to decode the high-power data stream.

As the high-power user terminal HP-UE got no other order from the base station, it only searches on all aggregation levels for a legacy DCI format related to its cell-specific radio network temporary identifier C_RNTI_HP-UE, in which it finds all the information it needs to decode the high-power data stream.

FIG. 7 schematically shows an example of a coding format of aggregation level ranges and downlink control information according to an embodiment of the invention.

As described above, in an embodiment of the invention, the extended DCI format also comprises a value AL indicating an aggregation level or aggregation level range of the DCI of a user terminal which is linked by the extended DCI format leading to a reduced processing effort for searching DCIs of other user terminals.

In principle, there are four different amounts of resources defined for the grants, which are the so-called aggregation levels 1, 2, 4 and 8 with a number of 1, 2, 4 and 8 control channel elements respectively. A grant for a transmission to or from a user terminal experiencing very good radio conditions, i.e. the best case, will thus consume only one control channel element, while a grant for a transmission to or from a user terminal experiencing very bad radio conditions, i.e. worst case, will consume eight control channel elements.

In the table which is depicted in FIG. 7, the value AL indicating the aggregation level search space and the format of the linked DCI, i.e. legacy DCI format or extended DCI format, is coded by two bits.

The value AL=00 indicates, that the aggregation level is ≤2 and that the linked DCI is a legacy DCI.

The value AL=01 indicates, that the aggregation level is ≤2 and that the linked DCI is an RDMA DCI, i.e. an extended DCI.

The value AL=10 indicates, that the aggregation level is ≥4 and that the linked DCI is an RDMA DCI, i.e. an extended DCI.

The value AL=11 indicates, that the aggregation level is ≥4 and that the linked DCI is a legacy DCI.

FIG. 8 schematically shows in the upper part an example of an extended format of chain-like linked downlink control information comprising aggregation levels and an indication of the end of the chain according to an embodiment of the invention. Two data streams to a low-power user terminal LP-UE and to a high-power user terminal HP-UE are superimposed.

In order to be able to decode its data stream, the low-power user terminal LP-UE also has to decode the high-power data stream and therefore needs additional information which it gets by the procedure described in the following.

In order to be able to decode the high-power data stream of the high-power user terminal HP-UE, the low-power user terminal LP-UE is configured, e.g. by a serving base station, to search in the received downlink data for extended DCI formats related to its cell-specific radio network temporary identifier C_RNTI_LP-UE on all aggregation levels. Once the low-power user terminal LP-UE has found an extended DCI format related to its cell-specific radio network temporary identifier C_RNTI_LP-UE, the low-power user terminal LP-UE decodes the extended DCI.

In the decoded extended DCI, as shown in FIG. 8, there is both a DCI of the low-power user terminal DCI_LP-UE, and, according to the embodiment of the invention, a cell-specific radio network temporary identifier for the high-power user terminal C-RNTI_HP-UE. Furthermore, the extended DCI format also comprises a value AL indicating an aggregation level of the DCI of the high-power user terminal HP-UE which reduces the processing effort for the low-power user terminal LP-UE when searching the DCI for the high-power user terminal HP-UE.

An example of a possible coding of the aggregation level is depicted in FIG. 7 and is described above. In the example depicted in FIG. 8, the aggregation level of the DCI of the high-power user terminal HP-UE has been coded as AL=01, which means that the DCI of the high-power user terminal HP-UE has to be searched on an aggregation level ≤2 only. In addition the value AL=01 also indicates the DCI format of the high-power user terminal HP-UE, which in the example also is an extended DCI format.

The low-power user terminal LP-UE therefore searches in the received downlink data for an extended DCI format of the high-power user terminal related to the cell-specific radio network temporary identifier C_RNTI_HP-UE. Once the low-power user terminal LP-UE has found an extended DCI format related to the cell-specific radio network temporary identifier C_RNTI_HP-UE, the low-power user terminal LP-UE decodes the extended DCI.

In the decoded extended DCI, as shown in FIG. 8, there is both a DCI of the high-power user terminal DCI_HP-UE, in which the low-power user terminal LP-UE finds all the information needed to decode the high-power data stream, and, according to the embodiment of the invention, a cell-specific radio network temporary identifier C-RNTI which is 0 in order to indicate, that the end of the chain is reached, i.e. that no further DCI follows.

Furthermore, the extended DCI format also comprises a value AL which will not be evaluated in this case, as no further DCI is linked.

It is also possible that the DCI chain consists of one extended DCI only as indicated by setting in the extended DCI format related to the cell-specific radio network temporary identifier C_RNTI_LP-UE of the low-power user terminal LP-UE the cell-specific radio network temporary identifier C_RNTI to 0 as shown in the lower part FIG. 8.

Thus, there are in principle two possibilities to indicate the end of the chains of DCIs. Either, as indicated in FIG. 6, the value for the aggregation level AL indicates, that a legacy DCI follows and thus, the end of the chains of DCIs is reached, or, as indicated in FIG. 8, the cell-specific radio network temporary identifier C-RNTI in the extended RDMA DCI format becomes 0.

According to another embodiment of the invention, extended DCI formats, i.e. RDMA capable DCI formats, are generated by extending the LTE release 8 DCI formats by the cell-specific radio network temporary identifier (C-RNTI), the modulation and coding scheme (MCS), and the redundancy version (RV), which are describing the data stream of the high-power user terminal HP-UE.

FIG. 9 schematically shows such an example of an extended format of downlink control information comprising information needed to decode a data stream of another user terminal according to an embodiment of the invention.

The low-power user terminal LP-UE searches in the received downlink data for extended DCI formats related to its cell-specific radio network temporary identifier C_RNTI_LP-UE on all aggregation levels. Once the low-power user terminal LP-UE has found an extended DCI format related to its cell-specific radio network temporary identifier C_RNTI_LP-UE, the low-power user terminal LP-UE decodes the extended DCI.

In the decoded extended DCI, as shown in the upper part of FIG. 9, there is both a DCI of the low-power user terminal DCI_LP-UE, and, according to the embodiment of the invention, a cell-specific radio network temporary identifier C-RNTI_HP-UE, a modulation and coding scheme MCS_HP-UE, and a redundancy version RV_HP-UE for the high-power user terminal HP-UE, Thus, the low-power user terminal LP-UE has now all the information required to decode both, the high-power data stream and the low-power data stream as described above in FIG. 5.

The high-power user terminal HP-UE also has to search and decode its own DCI only, which is a legacy DCI, as depicted in the lower part of FIG. 9.

In this embodiment of the invention, only the radio signals for two user terminals can be superimposed.

In principle, a base station can decide which user terminals can be scheduled as low-power user terminals e.g. due to their capabilities to decode downlink data from other user terminals and based on path losses. Thus, RDMA capable user terminals can be scheduled as low-power or high-power user terminals, and legacy user terminals can be scheduled as potential high-power user terminals.

The base station may inform the respective low-power user terminals, e.g. via control channels, to decode the DCIs as extended DCIs, i.e. RDMA DCIs, only from now on. Thus, the base station may configure RDMA capable user terminals as low-power user terminals e.g. via control channels. As the path loss of the user terminals can vary during operation, the sorting mechanism can be performed regularly and changes can be signaled to the affected user terminals by the base station.

As an alternative, an RDMA capable user terminal can first try to find related legacy DCIs, and if such legacy DCIs can not be found, it then searches for related extended DCIs. In other words, an RDMA capable user terminal can perform a kind of blind decoding in order to find either legacy DCIs or extended DCIs, so that it must not be explicitly instructed by a base station to search for extended DCIs.

During scheduling, the base station, e.g. for each subframe, forms pairs, or groups of user terminals whose radio signals can be superimposed. As the user terminals can be informed about the results by the extended DCI formats, the user terminals whose radio signals can be superimposed can vary from subframe to subframe, i.e. the scheduler has full flexibility in defining pairs or groups of user terminals whose radio signals are superimposed on a per TTI basis (TTI=transmission time interval).

Several of such pairs or groups of user terminals whose radio signals are superimposed can be defined per subframe to ensure that as much as possible of the available resources can be used by applying RDMA transmission schemes. Generally, the extended DCI formats can be signaled via the physical downlink control channel, as e.g. the PDCCH in LTE, from the base station to the user terminals.

The invention claimed is:

1. A method for downlink communication between a base station and a user terminal by a downlink superimposed radio signal comprising downlink data for the user terminal and for at least one further user terminal that are transmitted using the same radio resources, the method comprising:
   transmitting the downlink data for the user terminal with lower power than the downlink data for the at least one further user terminal;
   sending control information in the downlink from the base station to the user terminal and enabling the user terminal to decode the downlink data for the at least one further user terminal; and
   repeatedly determining based on path losses and capabilities to schedule the decoding of downlink data from other user terminals, the user terminal, and the at least one further user terminal to which downlink data are transmitted on the same radio resources resulting in the superimposed radio signal,
   wherein the control information comprises information that enables the user terminal to successively reduce the superimposed radio signal by decoding the downlink data for the at least one further user terminal in the order of the downlink transmission power starting with the highest one, reconstructing a radio signal of the downlink data for the at least one further user terminal, and subtracting the radio signal of the downlink data for the at least one further user terminal from the superimposed radio signal,
   wherein the control information further comprises information that enables the user terminal to decode its own downlink data using the superimposed radio signal that has been reduced by the radio signal for the at least one further user terminal,
   wherein the control information for the user terminal and the at least one further user terminal are chain-like linked by a pointer in the control information for the user terminal pointing to the control information for another user terminal and indicate that data for two different user terminals is transmitted on the same physical resources,
   wherein the user terminal and the at least one further user terminal to which downlink data are transmitted on the same radio resources are determined for a time span of at least one subframe.

2. The method according to claim 1, wherein the control information for the user terminal comprises an aggregation level range that enables the user terminal to search for the control information for the other user terminal.

3. The method according to claim 1, wherein a dedicated value of a pointer in the control information for the user terminal indicates that no further downlink data for the further user terminal are comprised in the downlink superimposed radio signal.

4. The method according to claim 1, wherein the control information for the user terminal comprises control information of the at least one further user terminal that enables the user terminal to decode the downlink data for the at least one further user terminal.

5. The method according to claim 1, wherein the control information is sent in downlink from the base station to the user terminal via at least one physical downlink control channel.

6. The method according to claim 1, wherein the user terminal is enabled to perform radial space-division multiple access.

7. A base station for downlink communication with a user terminal by a downlink superimposed radio signal comprising downlink data for the user terminal and for at least one further user terminal that are transmitted using the same radio resources, said base station comprising at least one processor configured to:
   transmit the downlink data for the user terminal with lower power than the downlink data for the at least one further user terminal;
   send control information in downlink to the user terminal that enables the user terminal to decode the downlink data for the at least one further user terminal, wherein control information for the user terminal and the at least one further user terminal are chain-like linked by a pointer in the control information for the user terminal pointing to the control information for another user terminal and indicate that data for two different user terminals is transmitted on the same physical resources, and repeatedly determine based on path losses and capabilities to schedule the decoding of downlink data from other user terminals, the user terminal, and the at least one further user terminal to which downlink data are transmitted on the same radio resources resulting in the superimposed radio signal, wherein the control information comprises information that enables the user terminal to successively reduce the superimposed radio signal by decoding the downlink data for the at least one further user terminal in the order of the downlink transmission power starting with the highest one, reconstructing a radio signal of the downlink data for the at least one further user terminal, and subtracting the radio signal of the downlink data for the at least one further user terminal from the superimposed radio signal, wherein the control information further comprises information that enables the user terminal to decode its own downlink data using the superimposed radio signal that has been reduced by the radio signal for the at least one further user terminal, and wherein the user terminal and the at least one further user terminal to which downlink data are transmitted on the same radio resources are determined for a time span of at least one subframe.

8. A user terminal for downlink communication with a base station by a downlink superimposed radio signal comprising downlink data for the user terminal and for at least one further user terminal that are transmitted using the same radio resources, said user terminal comprising at least one processor configured to:

receive downlink data with a lower power than the downlink data for the at least one further user terminal;

decode control information for the user terminal and the at least one further user terminal received in the downlink, wherein the control information for the user terminal and the at least one further user terminal are chain-like linked by a pointer in the control information for the user terminal pointing to the control information for another user terminal and indicate that data for two different user terminals is to be transmitted on the same physical resources;

successively reduce the superimposed radio signal by decoding the downlink data for the at least one further user terminal in the order of the downlink transmission power starting with the highest one, reconstructing a radio signal of the downlink data for the at least one further user terminal, and subtracting the radio signal of the downlink data for the at least one further user terminal from the superimposed radio signal; and decode downlink data using the superimposed radio signal that has been reduced by the radio signal for the at least one further user terminal, wherein the user terminal is informed repeatedly by the base station based on path losses and capabilities to schedule the decoding of downlink data from other user terminals by the base station about the at least one further user terminal to which downlink data are transmitted on the same radio resources resulting in the superimposed radio signal, the at least one further user terminal to which downlink data are transmitted being scheduled on the same radio resources as the user terminal for a time span of at least one subframe.

9. A communication network comprising at least one base station according to claim 7 and at least one user terminal configured to provide downlink communication with a base station by a downlink superimposed radio signal comprising downlink data for the user terminal and for at least one further user terminal that are transmitted using the same radio resources, said user terminal comprising at least one processor configured to successively reduce the superimposed radio signal by decoding the downlink data for the at least one further user terminal in the order of the downlink transmission power starting with the highest one, reconstructing a radio signal of the downlink data for the at least one further user terminal, and subtracting the radio signal of the downlink data for the at least one further user terminal from the superimposed radio signal, and decode its own downlink data using the superimposed radio signal that has been reduced by the radio signal for the at least one further user terminal.

* * * * *